(12) United States Patent
Saito

(10) Patent No.: US 8,042,005 B2
(45) Date of Patent: Oct. 18, 2011

(54) LIBRARY APPARATUS, CONVEYANCE CONTROLLER, AND CONTROL METHOD THEREOF

(75) Inventor: Kinya Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 195 days.

(21) Appl. No.: 12/388,715

(22) Filed: Feb. 19, 2009

(65) Prior Publication Data

US 2009/0210753 A1    Aug. 20, 2009

(30) Foreign Application Priority Data

Feb. 20, 2008 (JP) ................................. 2008-038874

(51) Int. Cl.
*G06F 11/00* (2006.01)
(52) U.S. Cl. ........................................................ 714/43
(58) Field of Classification Search .................... 714/43
See application file for complete search history.

(56) References Cited

U.S. PATENT DOCUMENTS

| | | | | |
|---|---|---|---|---|
| 3,134,550 A | * | 5/1964 | Camras ..................... 242/332.1 |
| 3,789,160 A | * | 1/1974 | Bruer et al. ................... 360/86 |
| 4,481,617 A | * | 11/1984 | Mabry ........................ 720/629 |
| 4,691,617 A | * | 9/1987 | Purkott ..................... 91/167 R |
| 4,864,438 A | * | 9/1989 | Munro ........................ 360/92.1 |
| 5,253,246 A | * | 10/1993 | Leonhardt et al. ............ 720/725 |
| 5,303,214 A | * | 4/1994 | Kulakowski et al. ......... 369/30.3 |
| 5,386,545 A | * | 1/1995 | Gombos et al. ......... 707/999.204 |
| 5,640,510 A | * | 6/1997 | Hanaoka et al. ................ 714/42 |
| 7,213,118 B2 | * | 5/2007 | Goodman et al. ............ 711/163 |
| 7,644,318 B2 | * | 1/2010 | Dicorpo et al. ................ 714/43 |
| 7,809,990 B2 | * | 10/2010 | Sasaki .............................. 714/42 |
| 2006/0015770 A1 | * | 1/2006 | Dicorpo et al. .................... 714/5 |
| 2006/0039248 A1 | * | 2/2006 | Sasaki ........................ 369/30.27 |
| 2006/0126211 A1 | * | 6/2006 | Sasaki .......................... 360/74.4 |
| 2007/0043958 A1 | | 2/2007 | Sasaki |
| 2010/0114361 A1 | * | 5/2010 | Starr et al. .................... 700/214 |

FOREIGN PATENT DOCUMENTS

JP   2004-055020   2/2004
JP   2005-149535   6/2005

\* cited by examiner

*Primary Examiner* — Amine Riad
(74) *Attorney, Agent, or Firm* — Staas & Halsey LLP

(57) ABSTRACT

A library apparatus includes, a drive for accessing the mobile medium, a discharge unit for discharging the mobile medium, and a conveyance controller for controlling a conveyance unit. The conveyance controller includes, a memory for storing process content when the discharge unit discharges the mobile medium, a receiver for receiving control information regarding a control unit controlling a discharge operation of the mobile medium, where the control unit is arranged in a host apparatus. The library apparatus and controlling method include determining correct process content in the discharge operation of the mobile medium from the process content stored on the storage, in accordance with the received control information, and detecting a faulty discharge operation by determining, in accordance with the determination result of the correct process content, whether process content transmitted from the host apparatus is normal or not.

15 Claims, 8 Drawing Sheets

FIG. 7

| SEQUENCE | BACKUP SOFTWARE A | BACKUP SOFTWARE B |
|---|---|---|
| 1 | READ ELEMENT STATUS(DRIVE) | TEST UNIT READY(DRIVE) |
| 2 | READ ELEMENT STATUS(ROBOT) | TEST UNIT READY(ROBOT) |
| 3 | READ ELEMENT STATUS(SLOT) | READ ELEMENT STATUS(DRIVE) |
| 4 | READ ELEMENT STATUS(IMPORT/EXPORT) | READ ELEMENT STATUS(ROBOT) |
| 5 | MODE SENSE(ROBOT) | READ ELEMENT STATUS(IMPORT/EXPORT) |
| 6 | TEST UNIT READY(ROBOT) | MOVE MEDIA(DRIVE TO IMPORT/EXPORT) |
| 7 | MOVE MEDIA(DRIVE TO IMPORT/EXPORT) | |

LIBRARY APPARATUS, CONVEYANCE CONTROLLER, AND CONTROL METHOD THEREOF

CROSS-REFERENCE TO RELATED APPLICATIONS

This application is related to and claims priority to Japanese patent application no. 2008-038874 filed on Feb. 20, 2008 in the Japan Patent Office, the entire contents of which are incorporated by reference herein.

FIELD

The present invention relates to a library apparatus managing a mobile medium, a conveyance controller of the library apparatus and a method of controlling the library apparatus.

BACKGROUND

Library apparatuses for managing a plurality of storage media such as a magnetic tape for storage backup data are known. The storage medium such as a magnetic tape, managed by the library apparatus, may be discharged externally out of the library apparatus to be stored outside or to be shipped to another facility. Generally, discharging of the storage medium is performed under the control of backup software.

Japanese Patent Laid-Open No. 2005-149535 discloses a magazine-type tape library apparatus. According to the disclosure, foreign object detecting unit detecting a foreign object is arranged at a port through which a magazine is discharged. Means is also arranged that restricts the movement of a foreign object in a direction close to the port for the magazine if an intrusion of the foreign object into the opening is detected.

Japanese Patent Laid-Open No. 2004-055020 discloses a hard disk apparatus. According to the disclosure, the inner pressure of the casing of the hard disk is maintained at a predetermined pressure. If an opening of the casing is detected by a sensor, a recording surface of a magnetic storage medium is destroyed, and an encryption/decryption circuit is also destroyed. In this way, content recorded on the magnetic storage medium is protected from an unauthorized use when the hard disk is opened.

Typically, an authorized user only can perform operation of discharging the storage medium housed in the library apparatus. The library apparatus itself has not recognized whether the discharge operation of a specified storage medium is authorized or not.

SUMMARY

In accordance with an embodiment, a library apparatus and method of controlling include accessing a mobile medium, discharging the mobile medium from the library apparatus, and controlling a conveyance unit for conveying a mobile medium to a predetermined position. The conveyance controller includes, a memory for storing process content when the discharge unit discharges the mobile medium, a receiver for receiving control information regarding a control unit (controller) controlling a discharge operation of the mobile medium, where the control unit is arranged in a host apparatus. A process content determiner is provided for determining correct process content in the discharge operation of the mobile medium from the process content stored on the storage, in accordance with the received control unit information, and a faulty operation detector for detecting a faulty discharge operation by determining, in accordance with a determination result of the correct process content, whether process content transmitted from the host apparatus is normal or not.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 7 is a table listing a command sequence of a backup software;

DETAILED DESCRIPTION OF EMBODIMENTS

Figure 1:
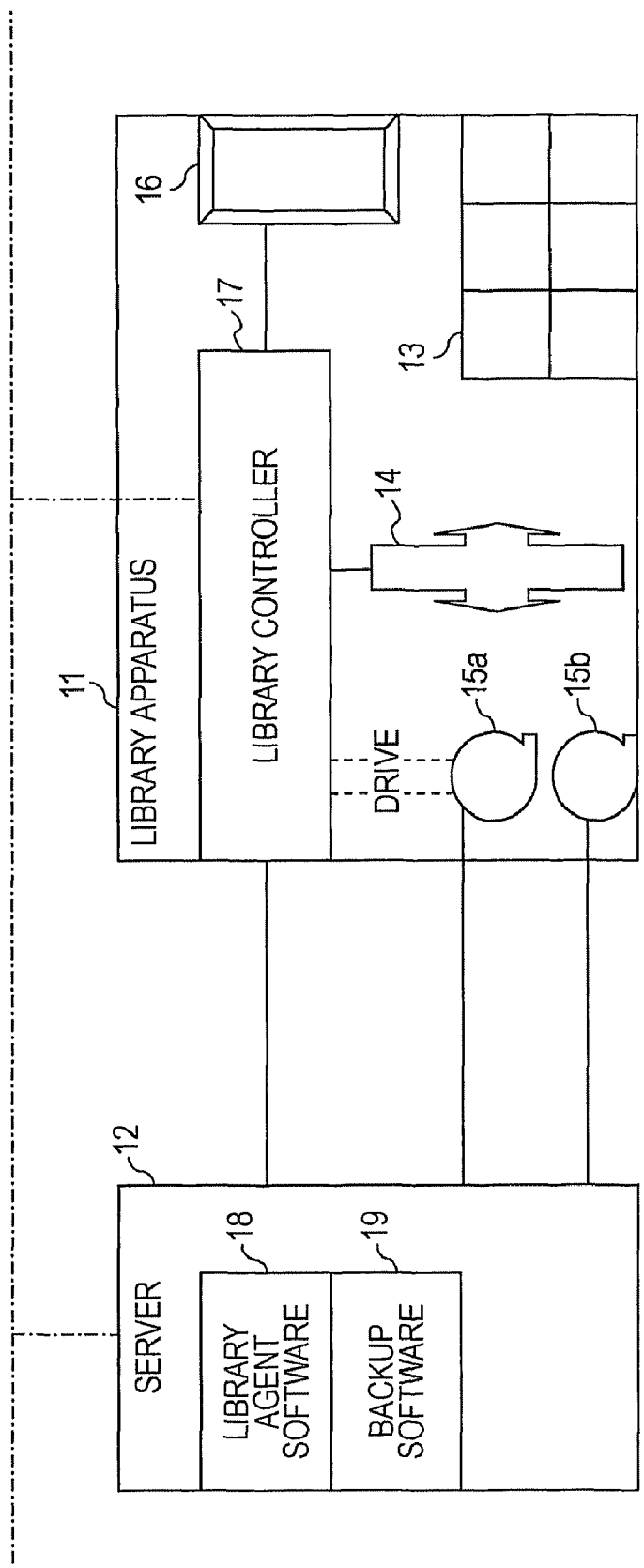
FIG. 1 illustrates a structure of a library apparatus in accordance with one embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

FIG. 1 illustrates a structure of a system including a library apparatus 11 and a server 12 in accordance with one embodiment of the present invention. In the system illustrated in FIG. 1, the library apparatus 11 is a tape library apparatus managing a magnetic tape.

The library apparatus 11 includes a medium holding cell 13 for holding mobile storage media such as magnetic tapes, a robot 14 for conveying the mobile storage medium, drives 15a and 15b, an entry and discharge section 16 receiving and discharging the mobile storage medium, and a library controller 17 for controlling these elements.

The robot 14 picks up a mobile storage medium held in the medium holding cell 13 and sets the mobile storage medium into the drives 15a and 15b or the entry and discharge section 16. The robot 14 also sets the mobile storage medium from one of the drives 15a and 15b and the entry and discharge section 16 to the medium holding cell 13. The drives 15a and 15b perform a read and write operation on the mobile storage medium loaded therein.

The server 12 includes backup software 19 for backing up the mobile storage medium, library agent software 18 for notifying the library apparatus 11 of information relating to currently running backup software, and other software. In the discussion that follows, all of a plurality of units of backup software or one of the pluralities of units of backup software is referred to as the backup software 19.

Figure 2:
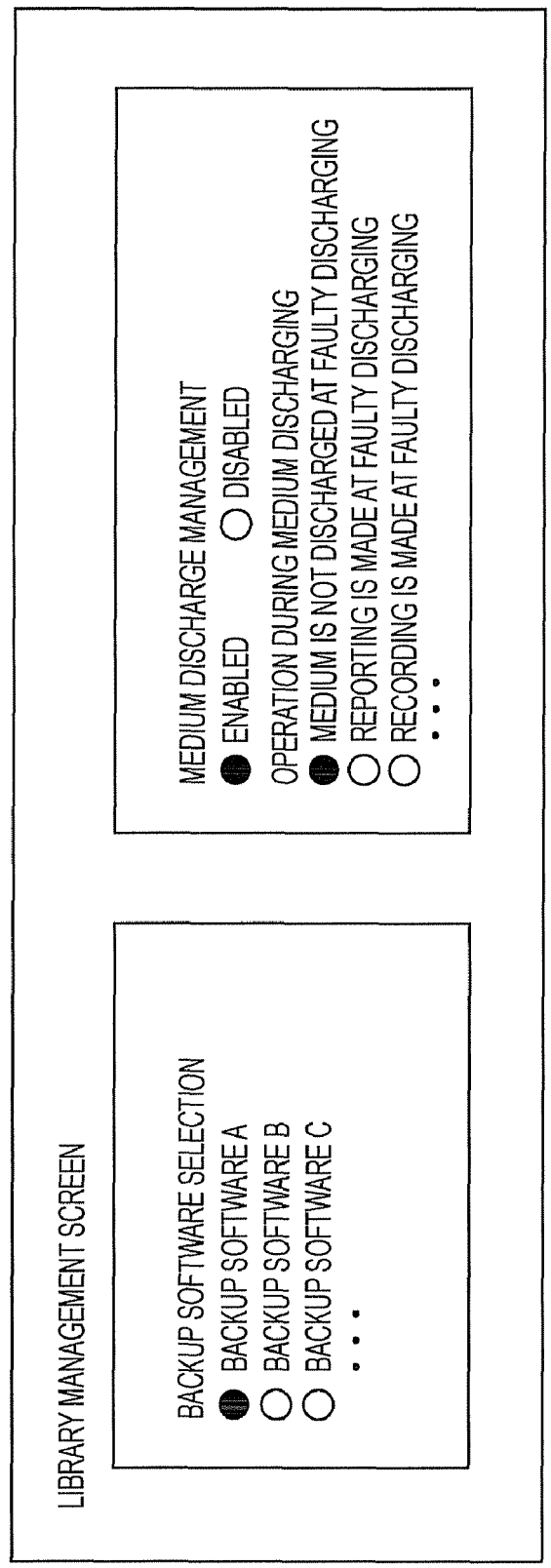
FIG. 2 illustrates a library management screen.

FIG. 2 illustrates a library management screen 21. The library management screen 21 selects the backup software to be used by the server 12, enables or disables medium discharge management, and sets a response operation if any fault is detected in a medium discharge operation.

The "enabled" setting or "disabled" setting for the medium discharge management is related to a determination as to whether the backup software having issued a medium discharge request is an authorized backup software or not. The operation(s) responsive to the detection of a fault in the medium discharge operation include "no medium is discharged at faulty discharging," "reporting is made at faulty discharging," "recording is made at faulty discharging," etc. Information set by the library management screen 21 is stored on a memory or the like. The function of the library management screen 21 for setting operation(s) responsive to the detection of the fault in the medium discharge operation corresponds to a response operation setter. Operation(s) in response to detection of a fault may be customized and/or adjusted as needed.

FIG. 2 illustrates a state of the library management screen 21 in which backup software A is selected, the medium discharge management is "enabled," and the operation "medium is not discharged at faulty discharging" is set as an operation to be implemented during medium discharging.

The library management screen 21 may be set by an authorized user. Alternatively, the server 12 may notify the library apparatus 11 of necessary information, and the library controller 17 may set information on the library management screen 21.

Figure 3:
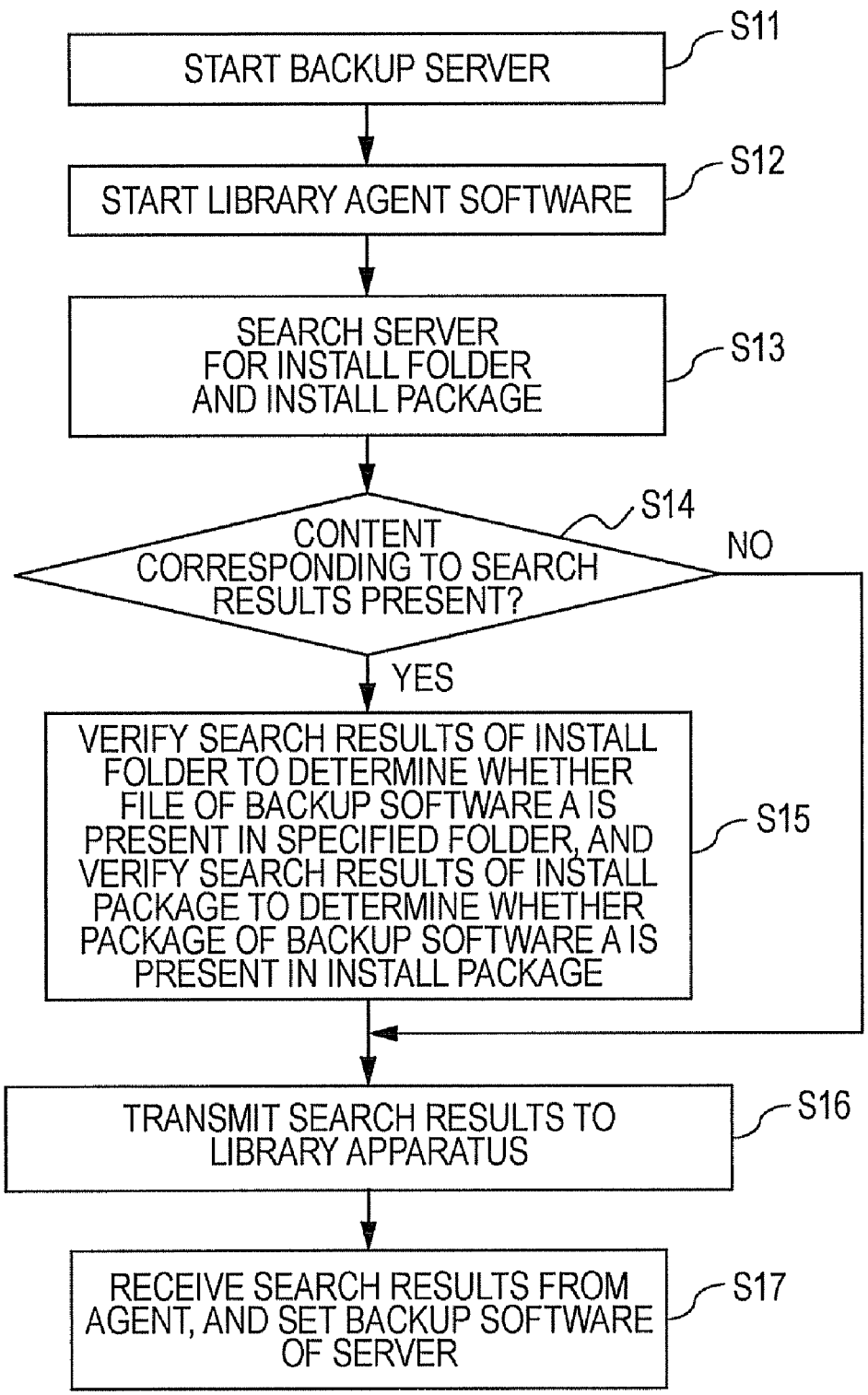
FIG. 3 is a flowchart illustrating a process of library agent software.

FIG. 3 is a flowchart illustrating a process of an agent software, for example, the library agent software 18. When the backup server 12 is started (operation S11), the library agent software 18 is started (operation S12).

The library agent software 18 searches the server 12 for an install folder and an install package (operation S13).

The library agent software 18 determines whether content corresponding to the backup software is in the search results (operation S14). If it is determined that the content corresponding to the backup software (an affirmative answer in operation S14), processing proceeds to operation S15. The library agent software 18 verifies the search results of the install folder and the search results of the install package. Through operation S15, the library agent software 18 determines whether a file of backup software A is present in the install folder, and/or whether a package of backup software A is present in the install package.

If it is determined that the corresponding content is not present in each of the install folder and/or the install package, i.e., that information relating to the backup software is not present (non-affirmative answer in operation S14), or if it is determined in operation S15 that the information relating to the backup software is present, processing proceeds to operation S16. The library agent software 18 transmits the search results to the library apparatus 11 at operation S16.

Upon receiving the search results, the library apparatus 11 sets, on a memory or the like, information relating to the backup software 19 used in the server 12 (operation S17).

Figure 4:
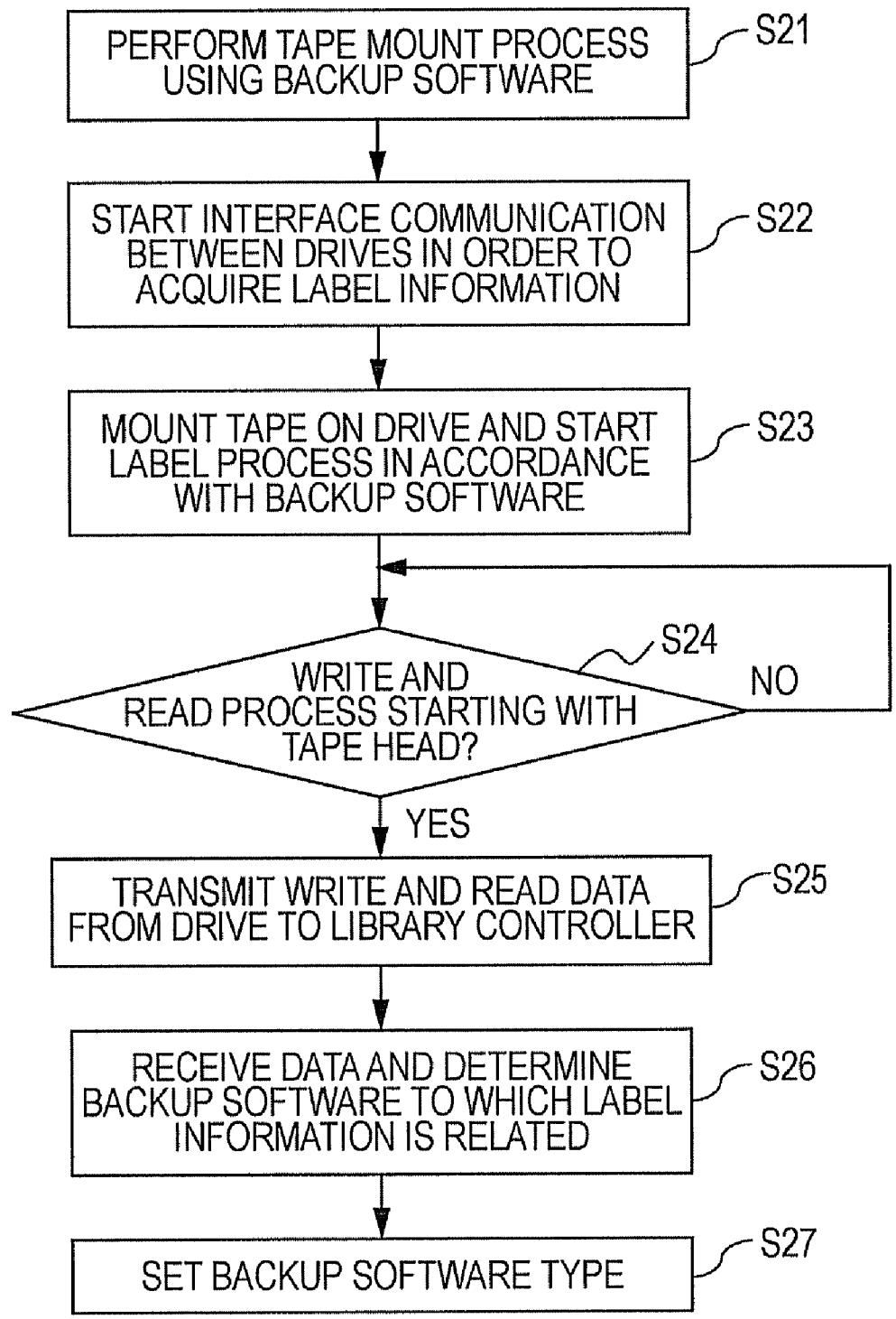
FIG. 4 is a flowchart illustrating a process for acquiring label information.

FIG. 4 is a flowchart illustrating a process of acquiring label information. The label information, recorded on a magnetic tape, identifies the backup software that has written data.

When a backup software, for example the backup software 19, performs a tape mount process (operation S21 in FIG. 4), the library controller 17 starts interface communication(s) with a drive 15a (or 15b) to acquire the label information (operation S22).

When the magnetic tape is mounted on the drive 15a, the backup software 19 starts a label process (operation S23).

It is then determined whether the process requested by the backup software 19 is a data write/read process from the head of the magnetic tape (operation S24).

If it is determined that the requested process is the data write/read process from the head of the magnetic tape (affirmative answer in operation S24), processing proceeds to operation S25. The label information written on the magnetic tape or the label information read from the magnetic tape is transmitted from the drive 15a to the library controller 17. The label information is information identifying the backup software 19 having written data, and contains a backup software name, for example.

The library controller 17 receives data from the drive 15a and determines which backup software 19 the label information is related to (operation S26).

The library controller 17 sets a type of the backup software 19 based on the received label information (operation S27). In operation S27, the backup software name is acquired from the label information and then stored onto the memory or the like.

Through operations S21-S27, the library controller 17 acquires the label information recorded on the magnetic tape and can identify, based on the label information, which backup software 19 has written data.

When the backup software 19 writes data onto the magnetic tape, the library controller 17 can acquire the label information, and generate a map mapping a plurality of magnetic tapes held in the medium holding cell 13 to the backup software 19. With the map generated, the library controller 17 can learn which backup software 19 has written data onto the magnetic tape when a discharge request of the magnetic tape is issued. The library controller 17 can thus determine whether the discharge request is the one made by authorized backup software 19.

Figure 5:
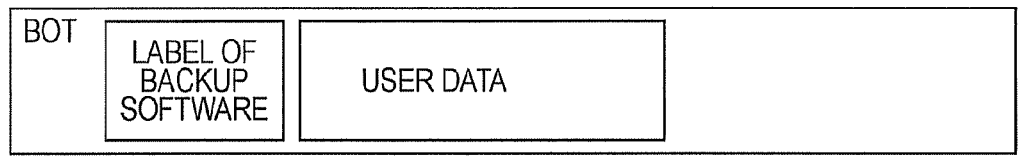
FIG. 5 illustrates a data structure of a magnetic tape.

FIG. 5 illustrates a data structure of a magnetic tape. With reference to FIG. 5, label information representing a backup software, for example the backup software 19, having written data is written on a head region of the magnetic tape, namely, the beginning of tape (BOT). In succession, user data is written. By reading the label information, the library controller 17 can identify which backup software 19 has written data onto the magnetic tape.

Figure 6:
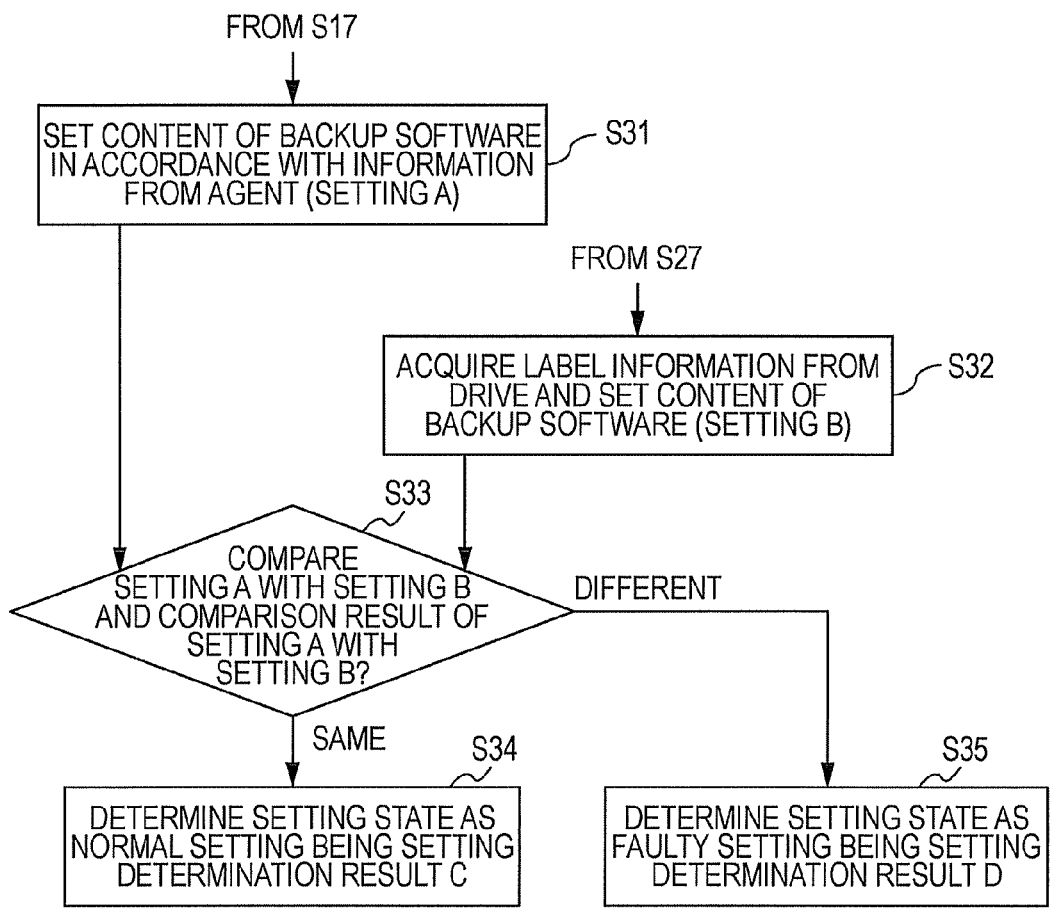
FIG. 6 is a flowchart illustrating a process of backup software.

FIG. 6 is a flowchart illustrating a process of determining a backup software.

In an embodiment, the library apparatus 11 performs operation S31 illustrated in FIG. 6 in succession to operation S17 illustrated in FIG. 3. In operation S31, the library apparatus 11 receives information relating to a backup software such as the backup software 19 from the library agent software 18, and stores, on the memory or the like, the content of the backup software running on the server 12, such as information identifying the backup software. The information stored then is referred to as setting A.

In an embodiment, the library apparatus 11 performs operation S32 illustrated in FIG. 6 in succession to operation S27 illustrated in FIG. 4. In operation S32, the library apparatus 11 retrieves the label information from the drive 15a or 15B, and stores, on the memory or the like, the content of the backup software 19 (identifying the backup software) in accordance with the label information. The information then stored is referred to as setting B.

The library apparatus 11 compares the setting A with the setting B to determine whether the two settings are identical (operation S33). If it is determined in operation S33 that the setting A and the setting B are identical to each other, i.e., the backup software 19 in operation is identical to the backup software 19 that has written data onto the magnetic tape to be discharged, processing proceeds to operation S34. The library apparatus 11 thus determines that the setting state is normal, and then stores a setting determination result C onto the memory or the like.

If it is determined in operation S33 that the setting A and the setting B are different from each other, i.e., the backup software 19 in operation is not identical to the backup software 19 that has written data onto the magnetic tape to be discharged, processing proceeds to operation S35. The library apparatus 11 thus determines that the setting state is faulty, and then stores a setting determination result D onto the memory or the like.

Through operations S31-S35, the library apparatus 11 acquires from the library agent software 18 the information relating to the backup software 19 (such as the software name), and determines whether the backup software 19 identified by the information is identical to the backup software 19 identified by the label information. The library apparatus 11 thus determines whether the backup software 19 having issued the discharge request of the magnetic tape is authorized backup software 19 or not.

FIG. 7 illustrates a table 31 in which a command sequence of a backup software is registered.

In the table 31 illustrated in FIG. 7, a command sequence at a medium discharging is registered with the backup software name mapped thereto. The command sequence corresponds to the content of the process to be performed at the medium discharging, and the table 31 corresponds to a storage for storing the content of the process.

For example, the command sequence of the backup software A has a command (read element status (drive)) to read the statuses of the drives 15a and 15b registered at a sequence number 1 and a command (read element status (robot)) to read the status of the robot 14 registered at a sequence number 2.

The command sequence of the backup software B has a command (test unit ready (drive)) to verify whether the drives 15a and 15b are ready to operate registered at a sequence number 1 and a command (test unit ready (robot)) to verify whether the robot 14 is ready to operate registered at a sequence number 2.

Whether the backup software 19 having issued a medium discharge request is the authorized backup software is determined by comparing the command sequence registered in the table 31 with the command sequence of the backup software 19 in operation.

Figure 8:
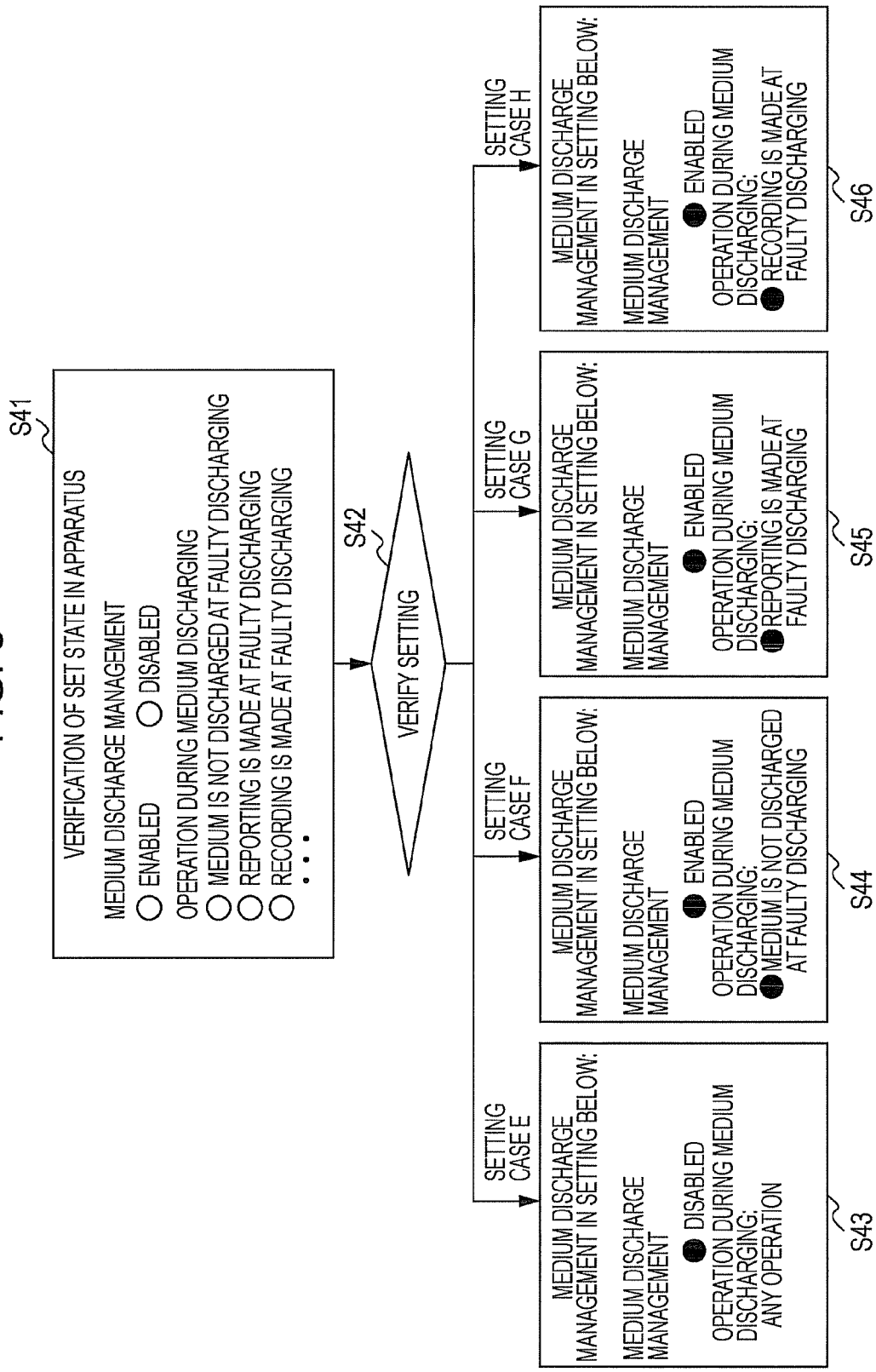
FIG. 8 is a flowchart illustrating a process for verifying a state set in a library management screen.

FIG. 8 is a flowchart illustrating a process of verifying a state set, for example, in the library management screen 21.

The library apparatus 11 acquires the information stored on the library management screen 21 and then stores the acquired information on the memory or the like (operation S41 in FIG. 8). The library management screen 21 sets information indicating whether to perform the medium discharge management and sets operation at the medium discharging.

The library apparatus 11 then verifies whether the state set in the library management screen 21 is one of setting cases E-H (operation S42).

If the medium discharge management is set to be "disabled," the library apparatus 11 determines that the state set is the setting case E because any operation during the medium discharging is acceptable (operation S43).

If the medium discharge management is set to be "enabled," and the operation during the medium discharging is set to be "medium is not discharged at faulty discharging," the library apparatus 11 determines that the state set is the setting case F (operation S44).

If the medium discharge management is set to be "enabled," and the operation during the medium discharging is set to be "reporting is made at faulty discharging," the library apparatus 11 determines that the state set is the setting case G (operation S45).

If the medium discharge management is set to be "enabled," and the operation during the medium discharging is set to be "recording is made at faulty discharging," the library apparatus 11 determines that the state set is the setting case H (operation S46).

Figure 9:
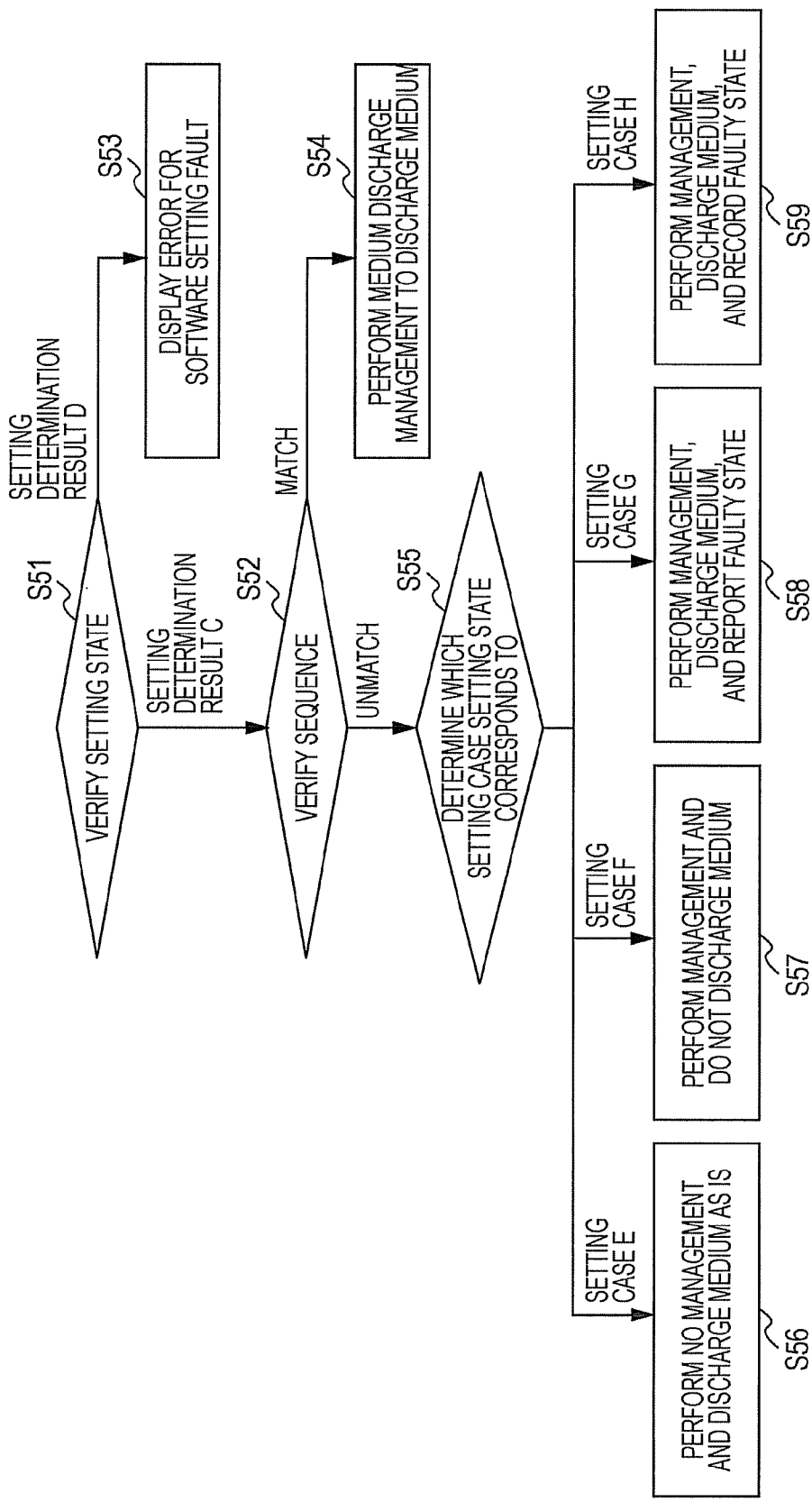
FIG. 9 is a flowchart illustrating a medium discharge monitoring process.

FIG. 9 is a flowchart illustrating a medium discharge monitoring process. The process to be discussed below is performed by the library controller 17 in the library apparatus 11.

The library controller 17 first verifies the setting state (operation S51 in FIG. 9). In operation S51, the library controller 17 determines the setting state based on the determination results (setting determination result C and setting determination result D) related to normal setting result or faulty setting result in the determination process of the backup software illustrated in FIG. 6.

If it is determined in operation S51 that the setting result is the setting determination result D, i.e., that the information about the backup software 19 in operation acquired from the library agent software 18 fails to match the label information of the magnetic tape, namely, the information about the backup software 19, processing proceeds to operation S53. The library controller 17 presents an error display as a software setting fault.

On the other, if it is determined in operation S51 that the setting state is the setting determination result C, i.e., that the information about the backup software 19 in operation acquired from the library agent software 18 matches the label information of the magnetic tape, namely, the information about the backup software 19, processing proceeds to operation S52. In operation S52, The library controller 17 determines whether the command sequence of the backup software 19 in operation matches the command sequence of the corresponding backup software 19 registered in the table 31. The library controller 17 thus detects a faulty discharge operation.

In operation S52, the library controller 17 references the table 31 illustrated in FIG. 7, thereby acquiring the command sequence (process content) of the corresponding backup software 19. In accordance with the acquired process content, the library controller 17 determines the correct process content in the medium discharge operation. The library controller 17 determines whether the process content of the backup software 19 having issued the medium discharge request matches the determined process result. The library controller 17 thus determines the correct process content to detect a faulty discharge operation.

If it is determined that the two sequences match each other (match answer in operation S52), processing proceeds to operation S54. The library controller 17 performs the medium discharge management, thereby discharging the medium.

On the other hand, if it is determined that the two sequences fail to match each other (unmatch answer in operation S52), processing proceeds to operation S55. The library controller 17 determines the response operation, depending on whether the state set in the library management screen 21 is one of the setting cases E-H (operation S55).

If it is determined that the sequences fail to match, and the setting case E is determined, i.e., if medium discharge management is set to be "disabled," and the operation at the medium discharging is that "medium is not discharged at faulty discharging," processing proceeds to operation S56.

The library controller 17 performs the medium discharge operation with no medium discharge management performed.

If it is determined that the sequences fail to match, and the setting case F is determined, i.e., if medium discharge management is set to be "enabled," and the operation at the medium discharging is that "medium is not discharged at faulty discharging," processing proceeds to operation S57. The library controller 17 stops the medium discharge operation, thereby discharging no medium. If an attempt is made to discharge the medium in a process sequence different from a process sequence of the registered backup software, the discharge operation is determined to be faulty, and the discharge operation of the medium is stopped.

If it is determined that the sequences fail to match, and the setting case G is determined, i.e., if medium discharge management is set to be "enabled," and the operation at the medium discharging is that "reporting is made at faulty discharging," processing proceeds to operation S58. The medium is discharged, and the faulty state is reported. If the medium is discharged in a process sequence different from a process sequence of the registered backup software, the discharge operation is determined to be faulty. The library apparatus 11, a host apparatus, or a system operator is notified that the faulty discharge operation has been performed.

If it is determined that the sequences fail to match, and the setting case G is determined, i.e., if medium discharge management is set to be "enabled," and the operation at the medium discharging is that "recording is made at faulty discharging," processing proceeds to operation S59. The medium is discharged, and the faulty state is recorded on the memory or the like.

In accordance with the above-described embodiments, the determination as to whether the backup software having issued the medium discharge request is the discharge request from an authorized backup software is made based on whether the label information recorded on the mobile storage medium matches the information identifying the backup software having written data. The process content of at least one piece of backup software, i.e., the command sequence is registered beforehand. It is then determined whether the process sequence of the backup software (the backup software 19) having issued the medium discharge request matches the registered process sequence. The library controller 17 thus determines whether the discharge operation is from the authorized backup software. For example, if it is determined that the discharge operation is from unauthorized backup software, the discharge operation of the medium is stopped. The library apparatus 11 thus prevents the storage medium from being discharged using unauthorized backup software installed on the server 12.

The present invention is not limited to the above-described embodiments. The present invention may be arranged as described below. In accordance with the above-described embodiments, the label information recoded on the magnetic tape is read, and it is then determined whether the read label information is identical to the information about the backup software in operation. Alternatively, when the backup software writes data onto the magnetic tape, information mapping the backup software writing the data onto the magnetic tape to the magnetic tape is stored on a storage such as a memory or the like. When a medium discharge request is issued, the information is referenced to determine whether the discharge request is from the authorized backup software. With this arrangement, the library apparatus can determine whether the backup software having issued the medium discharge request is authorized or not, without reading the label information from the magnetic tape.

Alternatively, the information recorded on the magnetic tape (information other than the label information) may be read in response to the medium discharge request, and it may be determined whether the backup software having issued the discharge request is the backup software having written backup data. Such arrangements provide the same advantages as those of the above-described embodiments. The present invention is not limited to the magnetic tape. The present invention is applicable to a mobile storage medium such as an optical disk or magneto-optical disk. In accordance with the above-described embodiments, it is determined whether the information related to the backup software, for example the backup software 19 of which the library agent software 18 in the server 12 notifies (such as the software name) matches the information read by the drive (such as the label information). Alternatively, without performing such a determination, the backup software may be identified in accordance with either the information provided by the server 12 or the information read from the drive. The process content of the backup software in operation (process sequence) is compared with the process content of the registered backup software 19. Depending on whether the two pieces of information match each other or not, it is determined whether the process content provided by the server 12 is a normal process. A faulty discharge operation is thus detected. With this arrangement, the information related to the backup software is simply obtained from one of the server 12 and the drive. The process for identifying the backup software is simplified. Means for notifying the library apparatus of the information related to the backup software in operation is not limited to the one by the library agent software. A central processing unit (CPU) of the server 12 may notify the library apparatus 11 of the related information. With such an arrangement, the library apparatus 11 can acquire the information related to the backup software in operation if the library agent software 18 is not present in the server 12. In accordance with the above-described embodiments, command sequences of two pieces of backup software 19 are registered in the table 31. The number of pieces of backup software 19 may be one or three or even more.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A library apparatus comprising:
 a drive capable of accessing a mobile medium;
 a discharge unit capable of discharging the mobile medium from the library apparatus; and
 a conveyance controller for controlling a conveyance unit for conveying the mobile medium to a predetermined position;
 said conveyance controller including:
   a memory that stores process content when the discharge unit discharges the mobile medium,
   a receiver that receives control information regarding a controller of a discharge operation of the mobile medium, the controller being arranged in a host apparatus,
   a process content determiner that determines correct process content in the discharge operation of the mobile medium from the process content stored on the memory, in accordance with the received control information, and a faulty operation detector that detects a faulty discharge operation in accordance with whether the determination result of the correct process content matches process content transmitted from the host apparatus.

2. The library apparatus according to claim 1, wherein the receiver receives the control information from the host apparatus.

3. The library apparatus according to claim 1, wherein the receiver receives the control information read from the mobile medium by the drive.

4. The library apparatus according to claim 1, comprising:
a reception result determiner that determines whether the control information regarding the controller transmitted from the host apparatus matches information regarding the controller stored on the mobile medium and read by the drive.

5. The library apparatus according to claim 1, further comprising a response operation setter that sets a response operation if a faulty discharge operation is detected.

6. A conveyance controller of a library apparatus for controlling a conveyance operation of a mobile medium, comprising:
a memory that stores process content when the mobile medium is discharged from a discharge unit in the library apparatus;
a receiver that receives control information regarding a controller of a discharge operation of the mobile medium, the controller being in a host apparatus;
a process content determiner that determines correct process content in the discharge operation of the mobile medium from the process content stored on the memory, in accordance with the received control information; and
a faulty operation detector that detects a faulty discharge operation in accordance with whether the determination result of the correct process content matches process content transmitted from the host apparatus.

7. The conveyance controller according to claim 6, wherein the receiver receives the control information regarding the controller transmitted from the host apparatus.

8. The conveyance controller according to claim 6, wherein the receiver receives information regarding the controller, read by the drive accessing the mobile medium.

9. The conveyance controller according to claim 6, comprising:
a reception result determiner that determines whether the control information regarding the controller transmitted from the host apparatus matches information regarding the controller stored on the mobile medium and read by the drive.

10. The conveyance controller according to claim 6, comprising:
a response operation setter that sets a response operation if a faulty discharge operation is detected.

11. A control method of a library apparatus for controlling a conveyance operation of a mobile medium, comprising:
receiving control information regarding a controller arranged in a host apparatus that controls a discharge operation of the mobile medium;
determining correct process content in the discharge operation of the mobile medium from the process content stored on a storage, in accordance with the received control information; and
detecting a faulty discharge operation in accordance with whether the determination result of the correct process content matches process content transmitted from the host apparatus.

12. The control method according to claim 11, wherein the receiving comprises:
receiving the control information regarding the controller transmitted from the host apparatus.

13. The control method according to claim 11, wherein the receiving comprises:
receiving information regarding the controller, stored on the mobile medium accessing a drive.

14. The control method according to claim 11, comprising:
determining whether the control information regarding the controller transmitted from the host apparatus matches information regarding the controller stored on the mobile medium and read by a drive.

15. The control method according to claim 11, comprising:
setting a response operation if a faulty discharge operation is detected.

* * * * *